Patented Sept. 5, 1939

2,171,796

UNITED STATES PATENT OFFICE 2,171,796

STARCH PROCESS

Alfred H. Kelling, Oak Park, Ill., assignor, by mesne assignments, to Corn Products Refining Company, New York, N. Y., a corporation of New Jersey No Drawing. Application May 29, 1937, Serial No. 145,579

5 Claims. (Cl. 127—33)

This invention relates to a novel starch product made from potato starch, or other non-cereal starch, such as tapioca starch or sago starch; these starches having characteristics, in respect to the products of the general type here concerned, which are quite different from the characteristics of cereal starches such as maize starch, for example. The product of this invention is produced by subjecting potato starch, for instance, in a moist but solid state and in the presence of a small quantity of borax uniformly distributed through the body of starch, to heat and pressure between rolls. The product consists of a starch material of which the starch cells are practically sufficiently disrupted so that cell structure is not identifiable by microscopic examination. The starch is modified, that is in addition to being gelatinized, and its solubility is in the neighborhood of 40%–65% by a test in which one gram is mixed with 100 cubic centimeters of water at 25° C. The product may be said to be substantially uniformly colloidal throughout. Its colloidal character is such that it can not be subjected to the usual tests for water absorption which are carried out by allowing the solids to settle and measuring the quantity of the supernatant water. When suspended and dispersed in water there is little or no precipitation of solids. The product may be used for various purposes. It is particularly suitable as a size for paper and when used for this purpose will respond to the "Mullen" test by giving a toughness or tenacity index as high as is given when three times the amount of gelatinized maize starch is used. This indicates that its strength as a binder of fibers is high.

The following is a description of the preferred method of making this product. It is understood, however, that this example is merely typical and informative. Modifications of operating data may be made without departing from the invention, as will be apparent to those skilled in the art.

The first step is to incorporate the water and borax in the body of starch to be treated so that the borax will be uniformly distributed and the mixture given a water content preferably between 28% and 55%, whereby it will be in a moist but solid state. This may be accomplished by stirring water, with borax in solution, into the starch little by little until the proper water content is obtained.

As an alternative method, a starch liquor of about 18° Baumé is made by mixing together starch and water in which borax has been dissolved or introducing borax into a starch milk of this density. This starch liquor is then dewatered on a vacuum filter to a moisture content of 44% moisture, the usual water content of the filter cake on filtering equipment of this type, and the filter cake then dried to a suitable moisture content, preferably 34%–36%. The amount of borax used is such that the borax in the finished product will be about 1%–2% of the starch, dry basis. In place of borax it is possible to use trisodium phosphate in equal amounts, soda ash in smaller quantities in proportion to stronger alkalinity, or caustic soda in still smaller amounts. Borax, however, is preferred.

The material in this state is fed between hollow internally heated cylinders. The degree of modification of the starch depends upon the temperature, amount of the alkali present, and the speed of rotation of the rolls which determines the duration of the heat treatment. The pressure is also a factor, that is the distance apart of the rolls, because affecting the intimacy of contact between the material treated and the heated roll surfaces.

A suitable apparatus consists of a pair of rolls 24 inches in diameter and 36 inches in length, heated by internal steam pressure of 140–150 pounds per square inch and rotated at 4½ revolutions per minute, the starch being fed to the rolls, which are substantially in contact at the start, but are mounted so as to yield sufficiently to allow a thin film of the starch to pass between them, at such a rate that 200 pounds of material are produced per hour. The operation dries the material sufficiently so that the films which are stripped from the rolls on the far sides thereof, can be milled, in reducing the material to the desired size, without further drying.

It will be understood that equivalent results can be obtained by reducing the temperature and increasing the duration of treatment; or, to some extent at least, by decreasing the temperature and increasing the water content. That is, increase of temperature, time and water content, each tends to increase the modifying action.

It is preferable to use potato starch rather than tapioca starch. Potato starch, thus treated, has a solubility in cold water of 40%–65%, whereas experiments go to show that tapioca starch has a solubility of about 30%–50%. The gelatinized potato starch gives a higher Mullen test index.

It is possible to use smaller amounts of borax or other salt than has been specified, or even to eliminate the salt entirely, but the character of the product will not be as good. Potato starch, otherwise treated as above, will have a solubility of only about 25% if the borax is omitted, and its Mullen index will be considerably lower than that indicated for the borax treated potato starch. When 1%–2% of borax is used the product in water will be almost entirely colloidal. If no borax or equivalent salt is used the product mixed with water will give a deposit of starch sediment.

I claim:

1. Process for the production of a modified starch which comprises: subjecting starch of the group consisting of potato, tapioca and sago starches having a moisture content of 25%–55%, and containing a small quantity of an alkaline salt of the group consisting of borax, tri-sodium phosphate, soda ash and caustic soda, to momentary pressure between rolls heated sufficiently to swell and disrupt the starch cells and give the product a solubles content of 30%–65%.

2. Process for the production of a modified starch which comprises: subjecting starch of the group consisting of potato, tapioca and sago starches having a moisture content of 25%–55%, and containing a small quantity of an alkaline salt of the group consisting of borax, tri-sodium phosphate, soda ash and caustic soda, to momentary pressure between rolls internally heated by steam pressure of 140–150 pounds per square inch to swell and disrupt the starch cells and give the product a solubles content of 30%–65%.

3. Process for the production of modified starch which comprises: subjecting potato starch having a moisture content of 28%–55% and containing 1%–2% of borax to momentary pressure between rolls sufficiently heated to swell and disrupt the starch cells and give the product a solubles content of 40%–65%.

4. Process for the production of modified starch which comprises: subjecting potato starch having a moisture content of 28%–55% and containing 1%–2% of borax to momentary pressure between rolls internally heated by steam pressure of 140–150 pounds per square inch, to swell and disrupt the starch cells and give the product a solubles content of 40%–65%.

5. Process for the production of modified starch which comprises: subjecting potato starch having a moisture content of 34%–36% with 1%–2% of borax to momentary pressure between rolls internally heated by steam pressure of 140–150 pounds pr square inch to swell and disrupt the starch cells and give the product a solubles content of 40%–65%.

ALFRED H. KELLING.